Oct. 22, 1968    R. CLOUGH    3,407,116
NUCLEAR REACTOR FUEL ELEMENTS
Filed Dec. 19, 1966
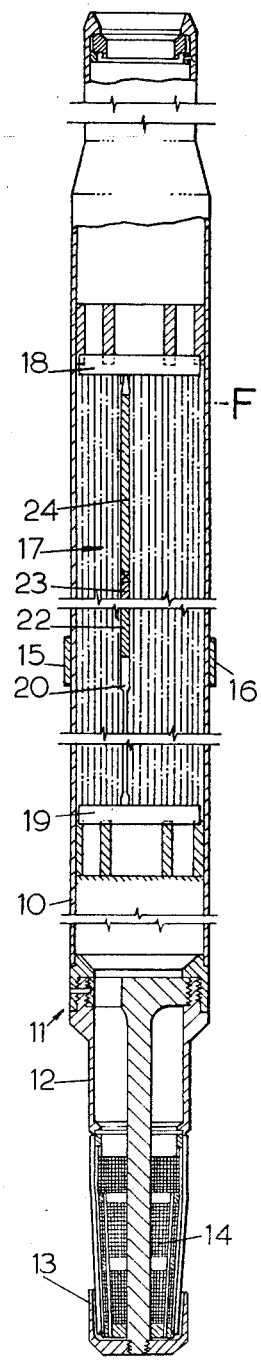
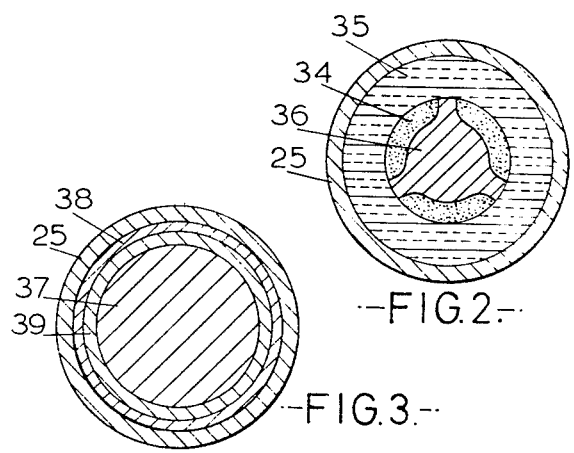

# United States Patent Office 3,407,116
Patented Oct. 22, 1968

3,407,116
NUCLEAR REACTOR FUEL ELEMENTS
Roy Clough, Warrington, England, assignor to United Kingdom Atomic Energy Authority, London, England
Filed Dec. 19, 1966, Ser. No. 602,926
10 Claims. (Cl. 176—68)

ABSTRACT OF THE DISCLOSURE

For a fast nuclear reactor, a fuel element of the kind having ceramic fuel in metallic sheathing, wherein the fuel is divided into inner and outer zones, and an interlayer is interposed between the sheathing and the adjoining surface of the outer zone, the outer zone having a higher concentration of fissile atoms than the inner zone, and the interlayer being either solely of solid thermal insulating material which does not contain fissile or fertile atoms or alternatively of material which includes fissile atoms. Where fissile atoms of plutonium are included in the fuel, they are preferably segregated exclusively in said outer zone. The zoned arrangement removes some of the heat generation potential from the central region of the fuel element and therefore results in a lowering of centre temperature, while the interlayer enables the fuel to be operated so hot as to assume a temperature-induced plasticity and so enable swelling resulting from irradiation to be accommodated internally of the fuel.

---

The present invention concerns nuclear reactor fuel elements having ceramic fuel in metallic sheathing; the fuel elements contemplated by the invention are considered particularly suitable for use in fast reactors. A ceramic fuel is a refractory chemical compound of uranium, plutonium or both, with or without added nonfissile compounds. Current research on ceramic fuels, such as mixed uranium/plutonium dioxide and monocarbide, is showing that fuel swelling in fast reactors can be a prime cause of fuel element sheathing failure and thereby produce a limit on attainable burnup of heavy atoms. There are strong economic incentives to achieve as high a fraction of heavy atom burnup as possible in fast reactors.

It is an object of the invention to mitigate the effects of irradiation-induced swelling in the fuel and so enable the burnup limit to be increased.

In an application of even date by J. P. Ellington there is put forward the concept of the fuel at its design heat output rating being as far as possible so hot as to assume a temperature-induced plasticity, or state of low creep resistance, which enables swelling resulting from irradiation to be accommodated internally of the fuel.

To achieve this plasticity there may be interposed between the fuel and the metallic sheathing surrounding it an interlayer of a solid thermal insulating material which does not contain fissile or fertile atoms. Although this interlayer has the desirable effect discussed in the Ellington application of diminishing the creep strength of the rim of fuel adjoining the interlayer, the basic effect of increasing the fuel temperatures means that special measures in design may be necessary if the maximum or centre temperature of the fuel is to be kept below the fuel melting point. Such a requirement commonly applies and it is therefore an object of the invention to provide for use with an insulating layer a fuel arrangement which will limit the fuel centre temperature.

This object is also applicable where an interlayer for the same purpose of achieving plasticity is provided with a content of fertile atoms as set forth in another application of even date by D. L. Linning.

Consistent with the aforementioned object, the invention divides the fuel into inner and outer zones, the outer zone which adjoints the interlayer being distinguished from the inner zone by having a higher concentration of fissile atoms. This zoned arrangement removes some of the heat generation potential from the central region of the fuel element and therefore results in a lowering of centre temperature. An increase of fission, and hence heat generation, will occur in the inner fuel zone as burnup proceeds if more fertile material is present in the inner zone as replacement for the fissile atoms segregated into the outer zone; this increase of fission arises of course from the conversion of the fertile atoms by breeding into fresh fissile atoms. In order to avoid as far as possible a change in the balance of fissile atoms between the zones, the fissile atoms should initially be segregated to the utmost into the outer zone. Thus, if plutonium enrichment is employed, the plutonium is conveniently introduced exclusively into the outer zone.

The invention will be further described with reference to the particular examples illustrated in the accompanying drawings in which:

FIG. 1 is a longitudinal section of a fuel assembly for a liquid metal cooled fast reactor, the fuel in this assembly being contained in fuel pins, and FIGS. 2 and 3 are cross sections to an enlarged scale through two forms of fuel pin embodying the invention in a manner suitable for use in the fuel assembly as shown in FIG. 1.

In FIG. 1 an outer hexagonal casing 10 of the assembly has a bottom fitting 11 comprising spaced cylindrical bearing surfaces 12 and 13 for fitting into a socket of a reactor core support structure so that the assembly is supported in cantilever fashion by this structure. Between the bearing surfaces there is a stainless steel knitmesh filter 14 which enables coolant (assumed in these examples to be sodium) supplied to an inlet plenum incorporated in the core support structure to enter into the bottom of the casing 10 and to be forced upwards therein. When positioned in the core each assembly is separated from its neighbours only by narrow gaps which are predetermined by the pitch of the sockets in the core support structure and by corner abutments or pads such as 15 and 16 projecting from the casing.

The fuel pins indicated 17 are clustered within the casing 10 in parallel array on a triangular lattice, the lattice pitch being large enough to ensure that the pins do not come into contact with one another; they float captively between top and bottom support plates 18 and 19 and are located transversely at intervals along the length of the cluster by grid structures (not shown). The coolant forced upwards in the casing therefore flows longitudinally over the pins for removal of the heat generated thereby.

The fuel pin appearing in section in FIG. 1 illustrates how a void length 20 amounting to about half the length of each pin to act as a reservoir for gases released by the fuel in service is arranged at the lower end. This void length is provided since the pins are assumed to be of the sealed type. Above the void length there are three sections represented diagrammatically, namely a lower breeder section 22, a fuel section 23 and an upper breeder section 24. It is with the fuel section that the invention is primarily concerned and therefore the content of the breeder sections can be arranged in any way which is appropriate in combination with the fuel section arrangement now to be described with reference to FIGS. 2 and 3.

In FIG. 2, it will be seen that the fuel is divided into an outer zone 34 and an inner zone or core 36. Between this two-zone fuel and thin-wall cylindrical sheathing 25 of the pin is an interlayer 35 of solid thermal insulating material which does not contain fissile or fertile atoms.

The outer fuel zone is solely of a ceramic compound of plutonium assumed in the present case to be $PuO_2$. The inner fuel zone is solely of a ceramic compound of a fertile material. Preferably the compounds in the two zones are of like type and have densities which are substantially the same percentage of the respective maximum theoretical density. Accordingly, the inner zone is assumed to be $UO_2$ which has at most a natural concentration of fissile isotope and is preferably depleted in this isotope. Three equispaced ribs have been shown on the inner zone to illustrate that continuity of the outer zone, or strict uniformity of its thickness, is not essential, the general object of the outer zone being to segregate fissile atoms away from the fuel centre. If the interlayer 35 is composed of a column of preformed annuli, the ribs of the inner zone may serve to centralise the inner zone within the interlayer.

The relative thickness of the interlayer in FIG. 2 derives from the assumptions that the solid thermal insulating material is alumina and that the outer surface of the outer fuel zone is to be 300° C. hotter than the outer surface of the interlayer at a linear fuel rating of 375 watts/cm. If the plutonium content were to have been mixed uniformly to form a $(UPu)O_2$ fuel completely filling the hole bounded by the interlayer at an average density of about 80% of the maximum theoretical density, it is estimated that the fuel centre temperature would have been about 2,200° C. hotter than the outer surface of the interlayer. With the fuel pin in service at the design heat output rating this outer surface is likely to have a temperature between 700 and 800° C. in the region of maximum burnup of the fuel, i.e., approximately the mid-length of the fuelled section of the pin, and therefore the center temperature would approach 3,000° C. which is regarded as excessive. With the two-zone arrangement, it is estimated on the basis of the same assumptions that the centre temperature is only between 1,100 and 1,200° C. hotter than the outer surface of the interlayer.

When use is made of an interlayer material having lower thermal conductivity than alumina, the thickness of the interlayer is reduced. This is demonstrated by the interlayer 38 in FIG. 3 which has a relative thickness appropriate to the use of zirconia with fuel of an oxide type as referred to above in connection with FIG. 2. The zirconia of the interlayer is best stabilised with calcium oxide for resistance against deterioration by neutron irradiation. The thermal conductivity of $UO_2$ is similar to that of zirconia, although generally slightly higher, and therefore the relative proportions of FIG. 3 are applicable if the interlayer 38 is looked upon as being of $UO_2$ which is either natural or depleted.

The changed proportions of FIG. 3 compared with FIG. 2 lead to the inner fuel zone 37 being so much larger that the interlayer 38 and outer fuel zone 39 are like coatings on the inner zone. Manufacturing processes for the application of coatings therefore suggest themselves for the making of this arrangement. In general the manufacture will depend on the nature of the materials, the required thicknesses and the densities. Apart from the processes already referred to, others which are open to consideration according to the circumstances are flame spraying and coextrusion. For densifying packed powder interlayers, or simply for ensuring tight engagement with the sheathing, use could be made of a rotary swaging or explosive forming operation performed on the sheathing after filling.

Regaring fuel density and interlayer thickness, it is preferred that the average fuel density, i.e., of the two zones taken together, is less than 85% of the maximum theoretical density and that the thickness is sufficient, having regard to the thermal conductivity of the interlayer material, to ensure that, when the fuel pin is in service at the design heat output rating, the temperature at the adjoining surface of the outer fuel zone is at least 1,000° C. in at least the region of maximum burnup of the fuel. The reasons underlying these figures are explained in the aforementioned applications by Ellington and Linning and reference should be made thereto, not only for an understanding of these reasons, but also for fuller description of the nature and purpose of the interlayer.

What I claim is:

1. In a nuclear reactor fuel element comprising metallic sheathing for exposure externally to a flowing coolant, ceramic fuel contained within the sheathing and possessing in aggregate a density which is less than the maximum theoretical density in order to include distributed voidage, and a solid interlayer disposed between and directly contacting both the sheathing and the fuel in order to increase the operating temperature of the latter, the improvement wherein the ceramic fuel comprises inner and outer zones, the outer zone adjoining the interlayer and having a higher concentration of fissile atoms than the inner zone.

2. The improvement according to claim 1, wherein fissile atoms of plutonium included in the fuel are segregated exclusively in the outer zone.

3. The improvement according to claim 2, wherein the outer zone is constituted solely of a ceramic compound of plutonium.

4. The improvement according to claim 1, wherein the outer zone is continuous and of substantially uniform thickness.

5. The improvement according to claim 1, wherein the inner zone is constituted solely of a ceramic compound of uranium having no more than the natural concentration of fissile atoms.

6. The improvement according to claim 1, wherein the interlayer comprises a ceramic compound of uranium having no more than the natural concentration of fissile atoms.

7. The improvement according to claim 6, wherein the interlayer is constituted solely by said ceramic compound of uranium and has a predetermined thickness such that, when the element is in service at the design heat output rating, the temperature at the adjoining outer zone surface is at least 1,000° C. in at least the region of maximum burnup of the fuel.

8. The improvement according to claim 1, wherein the interlayer is constituted solely of a thermal insulating material which does not contain fissile or fertile atoms.

9. The improvement according to claim 8, wherein the interlayer has a predetermined thickness such that, when the element is in service at the design heat output rating, the temperature at the adjoining outer zone surface is at least 1,000° C. in at least the region of maximum burnup of the fuel.

10. The improvement according to claim 1, wherein the average fuel density is less than 85% of the maximum theoretical density.

References Cited

UNITED STATES PATENTS

| | | | |
|---|---|---|---|
| 2,852,460 | 9/1958 | Abbott et al. | 176—68 |
| 2,853,446 | 9/1958 | Abbott et al. | 176—68 |
| 2,864,758 | 12/1958 | Shackelford | 176—91 X |
| 3,042,598 | 7/1962 | Crowther | 176—68 X |
| 3,072,555 | 1/1963 | Barth et al. | 176—72 X |
| 3,085,059 | 4/1963 | Burnham | 176—73 |
| 3,211,626 | 10/1965 | Nerenstone et al. | 176—73 |
| 3,215,607 | 11/1965 | Lackey | 176—73 X |
| 3,238,108 | 3/1966 | Deddens et al. | 176—73 X |
| 3,275,525 | 9/1966 | Bloomster et al. | 176—73 |
| 3,291,696 | 12/1966 | Sugimoto et al. | 176—68 |

BENJAMIN R. PADGETT, *Primary Examiner.*

M. J. SCOLNICK, *Assistant Examiner.*